US010502085B2

(12) United States Patent
Lord et al.

(10) Patent No.: US 10,502,085 B2
(45) Date of Patent: Dec. 10, 2019

(54) ANGLED REVERSE CORE GAS TURBINE ENGINE WITH WIDENED NOZZLE

(71) Applicant: United Technologies Corporation, Hartford, CT (US)

(72) Inventors: Wesley K. Lord, South Glastonbury, CT (US); Jesse M. Chandler, South Windsor, CT (US); Gabriel L. Suciu, Glastonbury, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 1345 days.

(21) Appl. No.: 14/265,856

(22) Filed: Apr. 30, 2014

(65) Prior Publication Data

US 2015/0240745 A1    Aug. 27, 2015

Related U.S. Application Data

(60) Provisional application No. 61/944,451, filed on Feb. 25, 2014.

(51) Int. Cl.
*F01D 13/00* (2006.01)
*F02K 3/04* (2006.01)

(52) U.S. Cl.
CPC ......... *F01D 13/003* (2013.01); *F01D 13/006* (2013.01); *F02K 3/04* (2013.01); *F05D 2250/314* (2013.01)

(58) Field of Classification Search
CPC ........ F01D 13/003; F01D 13/006; F02K 3/04; F02K 3/06; F02K 3/025; F05D 2250/314; B64D 33/04; B64D 33/045
See application file for complete search history.

(56) References Cited

U.S. PATENT DOCUMENTS

| | | | |
|---|---|---|---|
| 3,972,490 A | 8/1976 | Zimmermann et al. | |
| 4,500,055 A | 2/1985 | Krojer | |
| 5,699,662 A * | 12/1997 | Born | B64D 33/04 244/52 |
| 2001/0011691 A1 | 8/2001 | Provost | |
| 2002/0190158 A1 | 12/2002 | Franchet et al. | |
| 2006/0185346 A1 * | 8/2006 | Rolt | F02K 3/06 60/224 |
| 2008/0245925 A1 * | 10/2008 | Udall | B64C 5/02 244/52 |
| 2010/0155526 A1 | 6/2010 | Negulescu | |
| 2012/0272656 A1 * | 11/2012 | Norris | F02C 3/145 60/772 |

* cited by examiner

*Primary Examiner* — Craig Kim
*Assistant Examiner* — Katheryn A Malatek
(74) *Attorney, Agent, or Firm* — Carlson, Gaskey & Olds, P.C.

(57) ABSTRACT

A propulsion system for an aircraft includes a furcated nozzle that has at least a first duct that extends from a first propulsor to a first trailing end duct opening and a second duct that extends from a second propulsor to a second trailing end duct opening.

17 Claims, 5 Drawing Sheets

US 10,502,085 B2

ANGLED REVERSE CORE GAS TURBINE ENGINE WITH WIDENED NOZZLE

CROSS-REFERENCE TO RELATED APPLICATION

This application claims priority to US. Provisional Patent Application No. 61/944,451, filed Feb. 25, 2014.

STATEMENT REGARDING FEDERALLY SPONSORED RESEARCH OR DEVELOPMENT

This invention was made with government support under Contract No. NNX11AB35A, awarded by NASA. The Government has certain rights in this invention.

BACKGROUND

Conventional aircraft architecture includes wing-mounted gas turbine engines. In some aircraft architectures, gas turbine engines are mounted on top of the fuselage, or on opposite sides of the aircraft fuselage.

Commercial aircraft typically utilize gas turbine engines that in include a fan section driven by an engine core or gas generator. The engine core includes a compressor section, a combustor section and a turbine section. Air entering the compressor section is compressed and delivered into the combustion section where it is mixed with fuel and ignited to generate a high-speed exhaust gas flow. The high-speed exhaust gas expands through the turbine section to drive the compressor and the fan section through a driven shaft.

Alternate aircraft architectures may require alternate mounting locations of the gas turbine engines to enable specific wing and fuselage configurations. However, conventional gas turbine engine configurations have been developed to operate with conventional aircraft architectures.

Accordingly, alternate gas turbine engine configurations may be required and developed to enable implementation of favorable aspects of alternate engine architectures.

SUMMARY

A propulsion system for an aircraft according to an example of the present disclosure includes a first turbine engine that has a first engine core with a first intake duct. A second turbine engine includes a second engine core having a second intake duct. A first propulsor is coupled to be driven by the first turbine engine. The first propulsor is disposed about a first propulsor axis and the first engine core is disposed about a first core axis that is skewed from the first propulsor axis. A second propulsor is coupled to be driven by the second turbine engine. The second propulsor is disposed about a second propulsor axis parallel to the first propulsor axis. The second engine core is disposed about a second core axis that is skewed from the second propulsor axis. A furcated nozzle has at least a first duct extending from the first propulsor to a first trailing end duct opening and a second duct extending from the second propulsor to a second trailing end duct opening.

In a further embodiment of any of the foregoing embodiments, the first trailing end duct opening and the second trailing end duct opening are each elongated In a further embodiment of any of the foregoing embodiments, the first intake duct is within the first duct of the furcated nozzle, and the second intake duct is within the second duct of the furcated nozzle.

In a further embodiment of any of the foregoing embodiments, the first duct and the second duct share a common wall there between.

In a further embodiment of any of the foregoing embodiments, the first trailing end duct opening and the second trailing end duct opening are symmetric with respect to a plane between the first duct and the second duct.

In a further embodiment of any of the foregoing embodiments, the first trailing end duct opening is elongated along a first direction and the second trailing end duct opening is elongated along a second direction that is coaxial with the first direction.

In a further embodiment of any of the foregoing embodiments, the first trailing end duct opening is elongated along a first direction and the second trailing end duct opening is elongated along a second direction that is non-coaxial with the first direction.

In a further embodiment of any of the foregoing embodiments, at least the first trailing end duct opening includes four quadrants with regard to the first propulsor axis that are equal in cross-sectional area.

In a further embodiment of any of the foregoing embodiments, the first core axis, the second core axis, the first propulsor axis, and the second propulsor axis are non-coplanar.

In a further embodiment of any of the foregoing embodiments, the first core axis, the second core axis, the first propulsor axis, and the second propulsor axis are coplanar.

In a further embodiment of any of the foregoing embodiments, the first core axis is skewed from the second core axis.

In a further embodiment of any of the foregoing embodiments, the first turbine engine and the second turbine engine are respective reverse flow turbine engines.

A nozzle for a multi-engine propulsion system according to an example of the present disclosure includes a furcated nozzle that has a first duct that extends from a first forward end duct opening to a first trailing end duct opening and a second duct that extends from a second forward end duct opening to a second trailing end duct opening. The first trailing end duct opening and the second trailing end duct opening are elongated.

In a further embodiment of any of the foregoing embodiments, the first duct and the second duct share a common wall there between.

In a further embodiment of any of the foregoing embodiments, the first trailing end duct opening and the second trailing end duct opening are symmetric with respect to a plane between the first duct and the second duct.

In a further embodiment of any of the foregoing embodiments, the first trailing end duct opening is elongated along a first direction and the second trailing end duct opening is elongated along a second direction that is coaxial with the first direction.

In a further embodiment of any of the foregoing embodiments, first trailing end duct opening is elongated along a first direction and the second trailing end duct opening is elongated along a second direction that is non-coaxial with the first direction.

A propulsion system for an aircraft according to an example of the present disclosure includes a reverse flow turbine engine that has an engine core with an intake duct. A propulsor is coupled to be driven by the turbine engine. The propulsor is disposed about a propulsor axis and the engine core is disposed about a core axis that is skewed from the propulsor axis. A nozzle has at least one duct extending from the propulsor to a trailing end duct opening. The trailing end duct opening is elongated.

In a further embodiment of any of the foregoing embodiments, the trailing end duct opening is elongated in a direction with respect to the core axis.

In a further embodiment of any of the foregoing embodiments, the trailing end duct opening includes four quadrants with regard to the propulsor axis that are equal in cross-sectional area.

DETAILED DESCRIPTION

Figure 1:
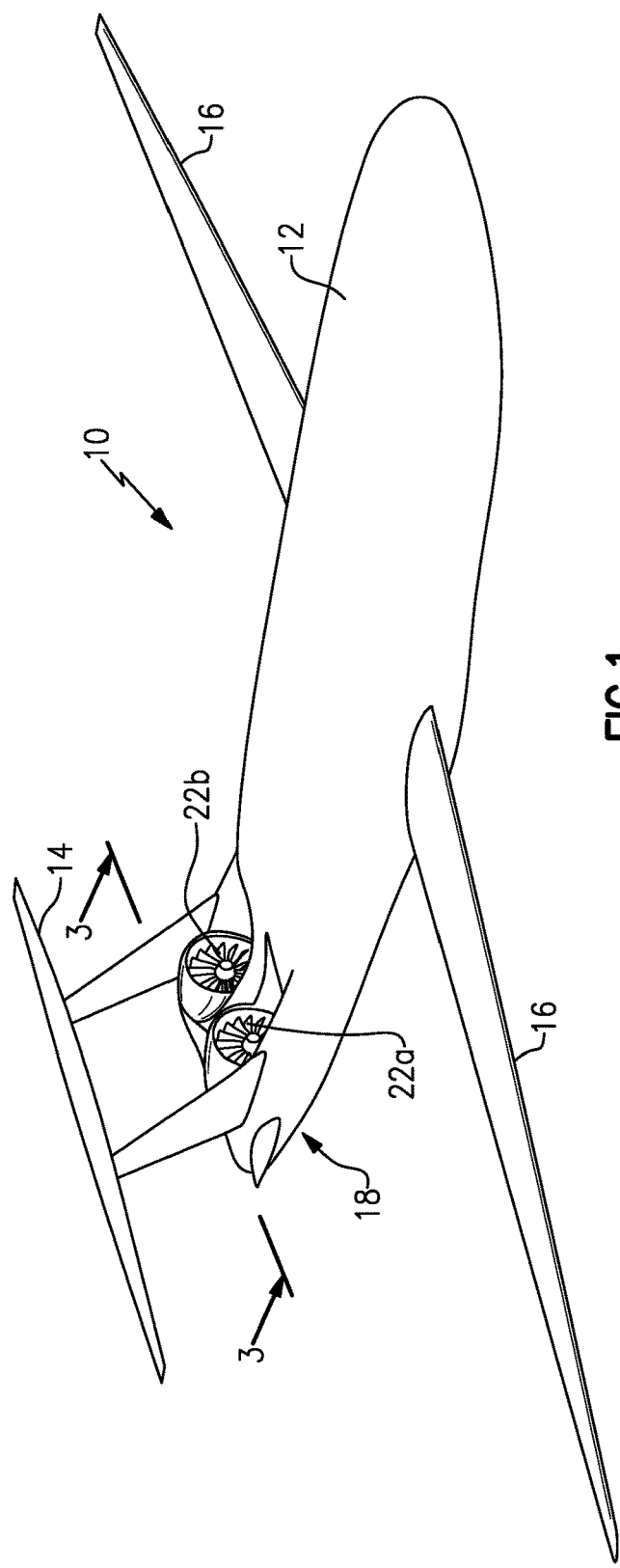
FIG. 1 is a schematic view of an aircraft including a propulsion system mounted within the fuselage.
Figure 2:
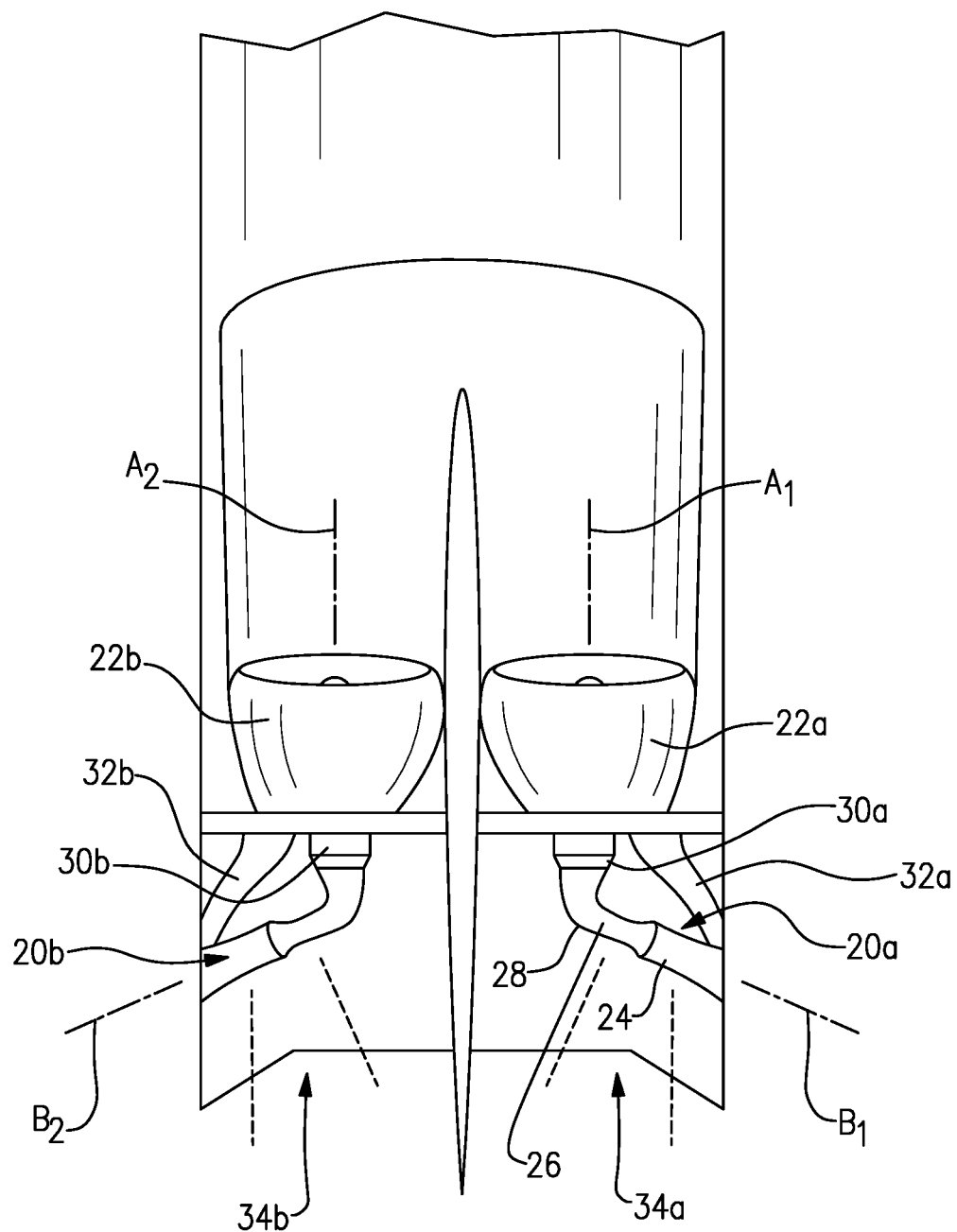
FIG. 2 illustrates an example propulsion system.

Referring to the FIGS. 1 and 2, an aircraft 10 includes a fuselage 12 having a tail 14 and wings 16. A propulsion system 18 is mounted at the aft end of the fuselage 12. The propulsion system 18 includes first and second engine cores 20a-b, which are reverse core gas turbine engines that drive corresponding first and second propulsors that include respective fan sections 22a-b. The first and second fan sections 22a-b provide the propulsive thrust of the disclosed propulsion system 18. Terms such as "aft," "trailing," "reverse," and "forward" are with reference to the normal operational attitude of an aircraft and turbine engines.

The fan sections 22a-b are disposed about respective corresponding propulsor axes A1 and A2. The first and second engine cores 20a-b are disposed about respective corresponding first and second engine axes B1 and B2. That is, the first engine core 20a is disposed about the first engine axis B1 and drives the first fan section 22a about the first propulsor axis A1, and the second engine core 20b is disposed about the second engine axis B2 and drives the second fan section 22b about the second propulsor axis A2.

The reverse engine cores 20a-b are gas generators that each include a compressor 24, a combustor 26, and a turbine 28. Air is drawn in through respective inlet ducts 32a-b to the compressors 24. The compressors 24 provide compressed air to respective combustors 26. In the combustors 26 air is mixed with fuel and ignited to generate an exhaust gas stream that expands through the respective turbines 28, which extract energy to drive the corresponding compressors 24 and first and second fan sections 22a-b. In this example, the engine cores 20a-b drive the corresponding first and second fan sections 22a-b through respective geared architectures 30a-b.

Figure 3:
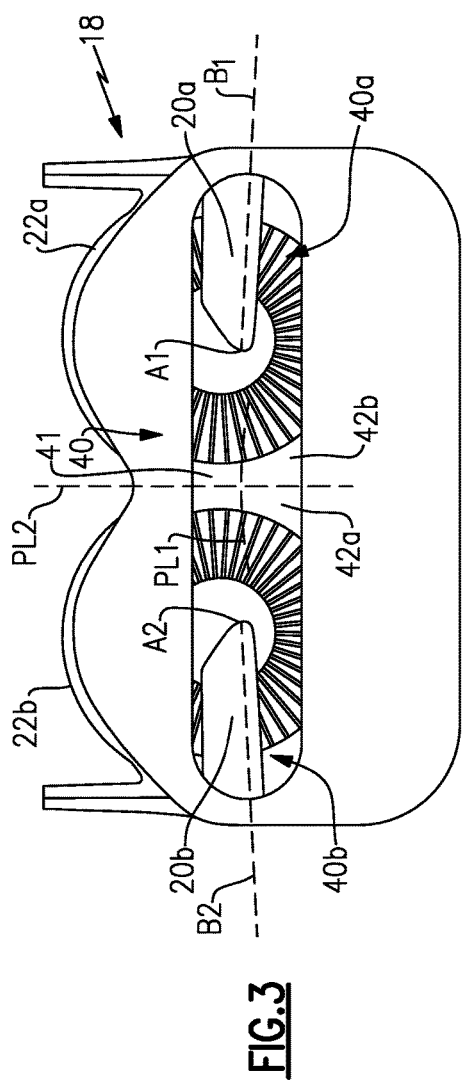
FIG. 3 illustrates the propulsion system of FIG. 2 according to the perspective shown in FIG. 1.

Each of the first and second fan sections 22a-b and related geared architectures 30a-b are mounted substantially parallel to each other about the respective propulsor axes A1 and A2. The first and second engine axes B1 and B2 are disposed at skewed angles relative to the corresponding propulsor axes A1 and A2. For example, the angle can be greater than about thirty (30) degrees, but is not limited to such angles. In this example, the first and second engine axes B1 and B2 are also skewed from each other, and the skewed angles relative to the corresponding propulsor axes A1 and A2 can be the same or different. Further, the propulsor axes A1 and A2 and the first and second engine axes B1 and B2 are coplanar, as shown in FIG. 3, with respect to plane PL1.

Gas turbine engines are not mounted next to each other due to practical limitations related to overall aircraft survivability in the event of engine failure. A burst zone is defined between gas turbine engines within which another gas turbine engine is not permitted due to possible fragmentation from one failed engine disabling the second engine.

The disclosed engine cores 20a-b are disposed at the angle relative to the corresponding propulsor axes A1 and A2. The angle is selected such that neither engine core 20a-b is located within a corresponding burst zone 36a-b of the other engine core 20a-b. Therefore, the angles are selected to orient the respective burst zones 36a-b away from the other engine core 20a-b. In a further example, the angle can be greater than about ninety (90) degrees. As can be appreciated given this disclosure, other angles can alternatively be utilized, depending on a defined shape of the respective burst zones 34a-b.

The burst zones 34a-b can be defined as respective annular regions about the corresponding engine cores 20a-b. For example, the annular region is disposed at an angle outward from a line that is perpendicular to the engine axes B1 and B2. An example angle is at least fifteen (15) degrees and can be determined based on application specific considerations. Moreover, airframe regulations may also define an angular span of the burst zones 34a-b. As can be appreciated given this disclosure, the angles disclosed herein are given with regard to particular reference axes. However, the angles can also be equivalently represented with regard to other reference axes of choice.

The relative orientation between the first and second engine cores 20a-b defines the corresponding burst zones 34a-b. Each burst zone 34a-b is non-intersecting with the other engine core 20a-b, and the angles and burst zones 34a-b can be selected to comply with application specific survivability requirements. Accordingly, because the gas generators are mounted in a configuration placing each outside of the burst zone 34a-b of the other, fuselage and substantially adjacent mounted propulsors are feasible within desired limitations. The side-by-side adjacent mounting configuration further enables alternate aircraft architectures.

FIG. 3 illustrates a view of the propulsion system 18 from behind the aircraft 10, as indicated in FIG. 1. The aft end of the fan sections 22a-b includes a furcated nozzle 40 (hereafter "nozzle 40"). The nozzle 40 in this example is a bi-furcated nozzle, although the examples herein can also be applied to other multi-furcated nozzles or even a single nozzle. The nozzle 40 has a first duct 40a and a second duct 40b that are divided, for at least a portion of the axial length of the ducts, by a common wall 41. The first ducts 40a and the second duct 40b extend from the respective fan sections 22a-b to respective trailing end duct openings 42a and 42b. For example, the trailing end duct openings 42a and 42b are openings that are circumscribed by the trailing edge of the nozzle 40.

Figure 4B:
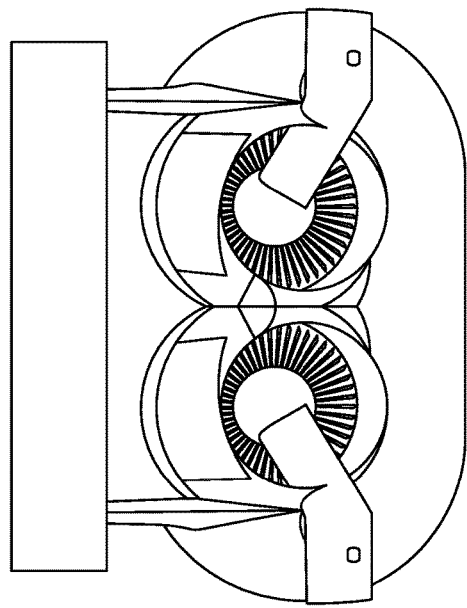
FIGS. 4A and 4B illustrate RELATED ART.
Figure 4A:
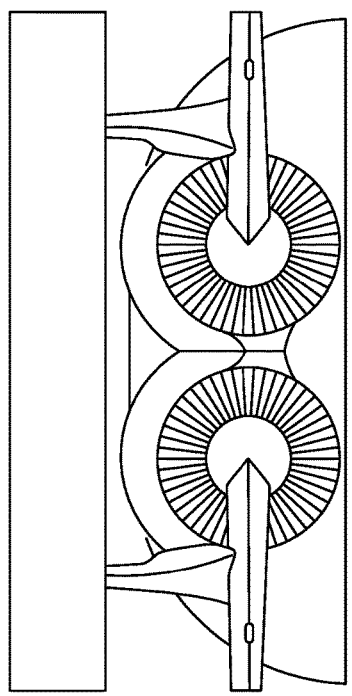

As shown, the first and second engine cores 20a-b (shrouded in respective outer aerodynamic fairings), which as described above extend at an angle to the respective axes A1 and A2, block a portion of the nozzle 40 cross-sectional area. As a comparison, the RELATED ART examples shown in FIGS. 4A and 4B include a bi-furcated nozzle that has round exit areas that are partially blocked by the engine cores. In this regard, portions of the engine cores and/or intake inlets extend laterally, outside of the nozzle. However, referring again to FIG. 3, the trailing end duct openings 42a and 42b of the nozzle 40 are each elongated such that the engine cores 20a-b and inlet ducts 32a-b are enclosed within the nozzle 40. As a result, the cross-sectional areas of the trailing end duct openings 42a and 42b are non-circular, to maintain smooth flow through the nozzle 40 given the blockage of the engine cores 20a-b. Further, in the example shown, the trailing end duct openings 42a and 42b are symmetric with respect to a plane PL2 between the ducts 40a and 40b.

Figure 5:
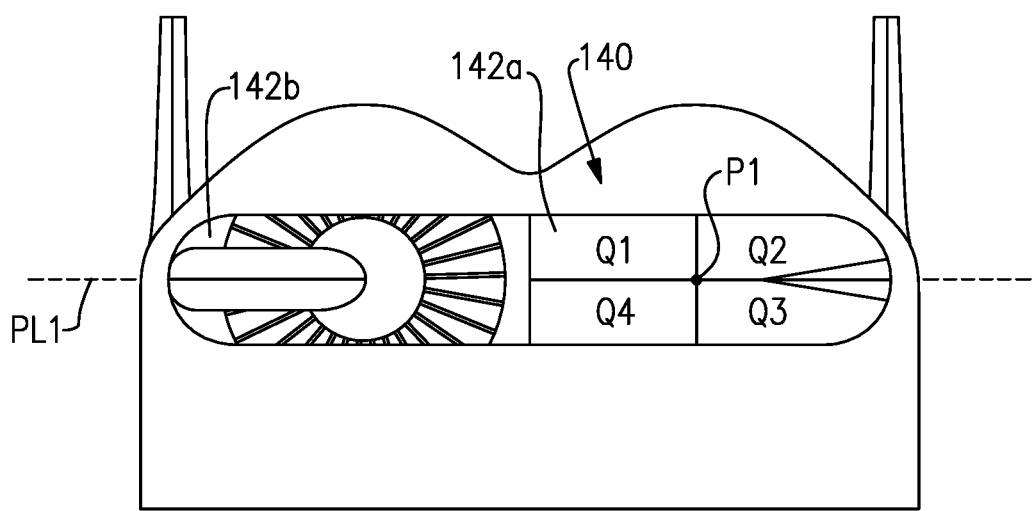
FIG. 5 illustrates an example propulsion system with equal-sized quadrants.

FIG. 5 shows a further example nozzle 140, in which the cross-sectional areas of the trailing end duct opening 142a, relative to center point P1 that is coaxial with A1, includes four quadrants, shown at Q1, Q2, Q3, and Q4. In this example, the quadrants are equal in cross-sectional area, to further enhance flow smoothness. The trailing end duct opening 142b can also have quadrants that are equal in cross-sectional area.

Figure 6:
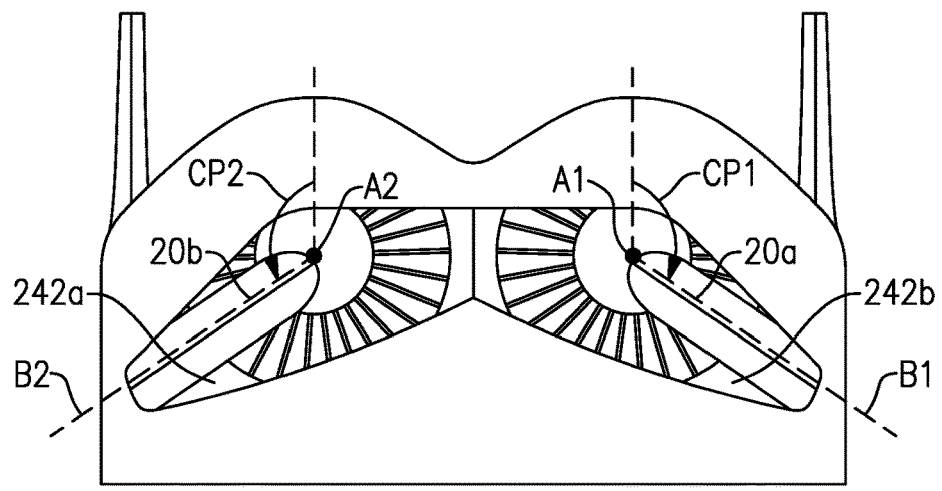
FIG. 6 illustrates another example propulsion system with downwardly elongated trailing end openings.

FIG. 6 shows another example in which the first and second engine cores 20a-b, and thus also the first and second engine axes B1 and B2, are circumferentially repositioned around the respective axes A1 and A2 in comparison to the example of FIG. 3. Whereas the propulsor axes A1 and A2 and the first and second engine axes B1 and B2 are coplanar with respect to plane PL (FIG. 3), the propulsor axes A1 and A2 and the first and second engine axes B1 and B2 are non-coplanar in FIG. 6 because of the circumferential positioning of the first and second engine axes B1 and B2 with respect to the axes A1 and A2.

Figure 7:
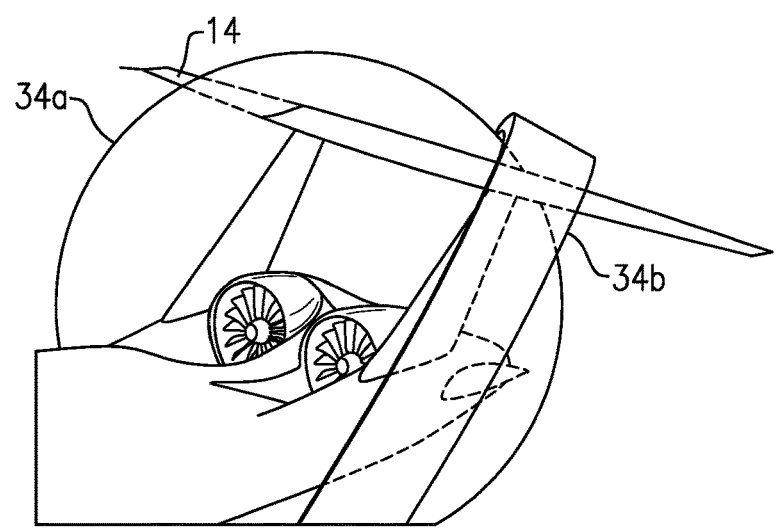
FIG. 7 illustrates a perspective view of blast zones.

The engine cores 20a-b and axes B1 and B2 are circumferentially located at, respectively, 3 o'clock and 9 o'clock positions in FIG. 3 (parallel axes B1/B2), the engine cores 20a-b and axes B1 and B2 are circumferentially located closer together in the example of FIG. 6. Thus, the positions of the first and second engine cores 20a-b can each be represented by an angle of the axes B1 and B2 relative to the respective axes A1 and A2 as well as circumferential angles of the axes B1 and B2 about the respective axes A1 and A2 with regard to a reference circumferential position. For example, as shown in FIG. 6, each of the circumferential positions CP1 and CP2 of the axes B1 and B2, relative to vertical twelve o'clock positions, is greater than 90°, and in further examples are equal to or greater than 120°. In this example, trailing end duct openings 242a and 242b are elongated with respect to the first and second engine cores 20a-b. As shown in FIG. 7, circumferential positions of greater than 90° orients the blast zones 34a-b away from aircraft structures, such as vertical/horizontal stabilizers and/or the tail 14.

In configurations using a reversed-flow angled core, fans may be placed side-by-side, but the cores (gas generators) must be angled to comply with the 1:20 rule. Each core engine must lie outside of the burst zone or the other, so the engines cannot be placed parallel to each other. In such a configuration, a portion of the core and inlet duct would be outside the normal nacelle/nozzle lines. In addition, the engine core represents a blockage that must be shrouded by an abnormally large bifurcating duct. The present disclosure can allow better area distribution and may also provide the design space necessary for the core and inlet duct to be fully contained within the nozzle. This may eliminate the need to have an aerodynamic fairing protruding from the side of the aircraft/nacelle.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A propulsion system for an aircraft, comprising:
   a first turbine engine including a first engine core having a first compressor, a first combustor, a first turbine, and a first intake duct leading into the first compressor;
   a second turbine engine including a second engine core having a second compressor, a second combustor, a second turbine, and a second intake duct leading into the second compressor;
   a first propulsor coupled to be driven by the first turbine engine, the first propulsor being disposed about a first propulsor axis and the first engine core being disposed about a first core axis that is skewed from the first propulsor axis;
   a second propulsor coupled to be driven by the second turbine engine, the second propulsor being disposed about a second propulsor axis parallel to the first propulsor axis, and the second engine core being disposed about a second core axis that is skewed from the second propulsor axis; and
   a furcated nozzle having at least a first duct extending from the first propulsor to a first trailing end duct opening and a second duct extending from the second propulsor to a second trailing end duct opening, wherein the first trailing end duct opening and the second trailing end duct opening are each laterally elongated.

2. The propulsion system as recited in claim 1, wherein the first intake duct is within the first duct of the furcated nozzle, and the second intake duct is within the second duct of the furcated nozzle.

3. The propulsion system as recited in claim 1, wherein the first duct and the second duct share a common wall there between.

4. The propulsion system as recited in claim 1, wherein the first trailing end duct opening and the second trailing end duct opening are symmetric with respect to a plane between the first duct and the second duct.

5. The propulsion system as recited in claim 1, wherein the first trailing end duct opening is elongated along a first direction and the second trailing end duct opening is elongated along a second direction that is coaxial with the first direction.

6. The propulsion system as recited in claim 1, wherein the first trailing end duct opening is elongated along a first direction and the second trailing end duct opening is elongated along a second direction that is non-coaxial with the first direction.

7. The propulsion system as recited in claim 1, wherein at least the first trailing end duct opening includes four quadrants with regard to the first propulsor axis that are equal in cross-sectional area.

8. The propulsion system as recited in claim 1, wherein the first core axis, the second core axis, the first propulsor axis, and the second propulsor axis are non-coplanar.

9. The propulsion system as recited in claim 1, wherein the first core axis, the second core axis, the first propulsor axis, and the second propulsor axis are coplanar.

10. The propulsion system as recited in claim 1, wherein the first core axis is skewed from the second core axis.

11. The propulsion system as recited in claim 1, wherein the first turbine engine and the second turbine engine are respective reverse flow turbine engines.

12. A nozzle for a multi-engine propulsion system, comprising:

a furcated nozzle including a first duct extending from a first forward end duct opening to a first trailing end duct opening and a second duct extending from a second forward end duct opening to a second trailing end duct opening, the first trailing end duct opening and the second trailing end duct opening being laterally elongated.

13. The nozzle as recited in claim 12, wherein the first duct and the second duct share a common wall there between.

14. The nozzle as recited in claim 12, wherein the first trailing end duct opening and the second trailing end duct opening are symmetric with respect to a plane between the first duct and the second duct.

15. The nozzle as recited in claim 12, wherein the first trailing end duct opening is elongated along a first direction and the second trailing end duct opening is elongated along a second direction that is coaxial with the first direction.

16. The nozzle as recited in claim 12, wherein the first trailing end duct opening is elongated along a first direction and the second trailing end duct opening is elongated along a second direction that is non-coaxial with the first direction.

17. The propulsion system as recited in claim 1, wherein the first core axis and the second core axis diverge in an aft direction.

* * * * *